May 19, 1953  E. R. SEWELIN  2,639,186
CAB MOUNTING

Filed Dec. 22, 1950  2 Sheets-Sheet 1

Inventor:
ERNEST R. SEWELIN
By: Paul O. Pippel
Attorney.

May 19, 1953 — E. R. SEWELIN — 2,639,186
CAB MOUNTING
Filed Dec. 22, 1950 — 2 Sheets-Sheet 2
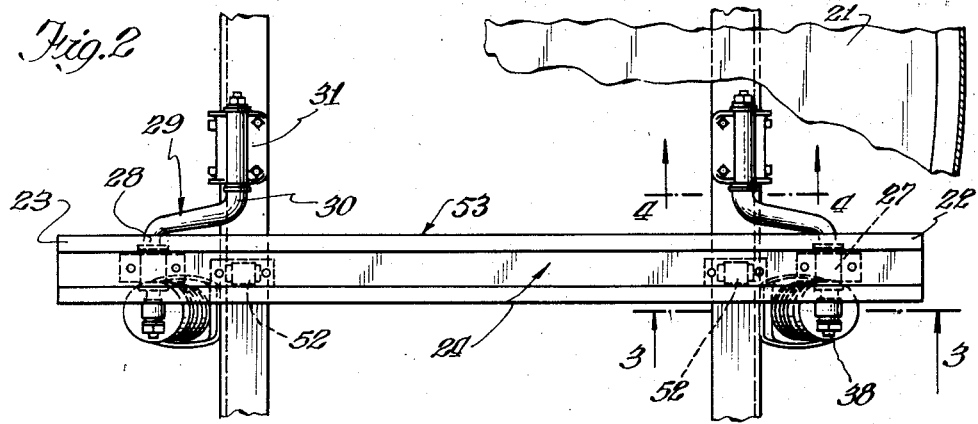
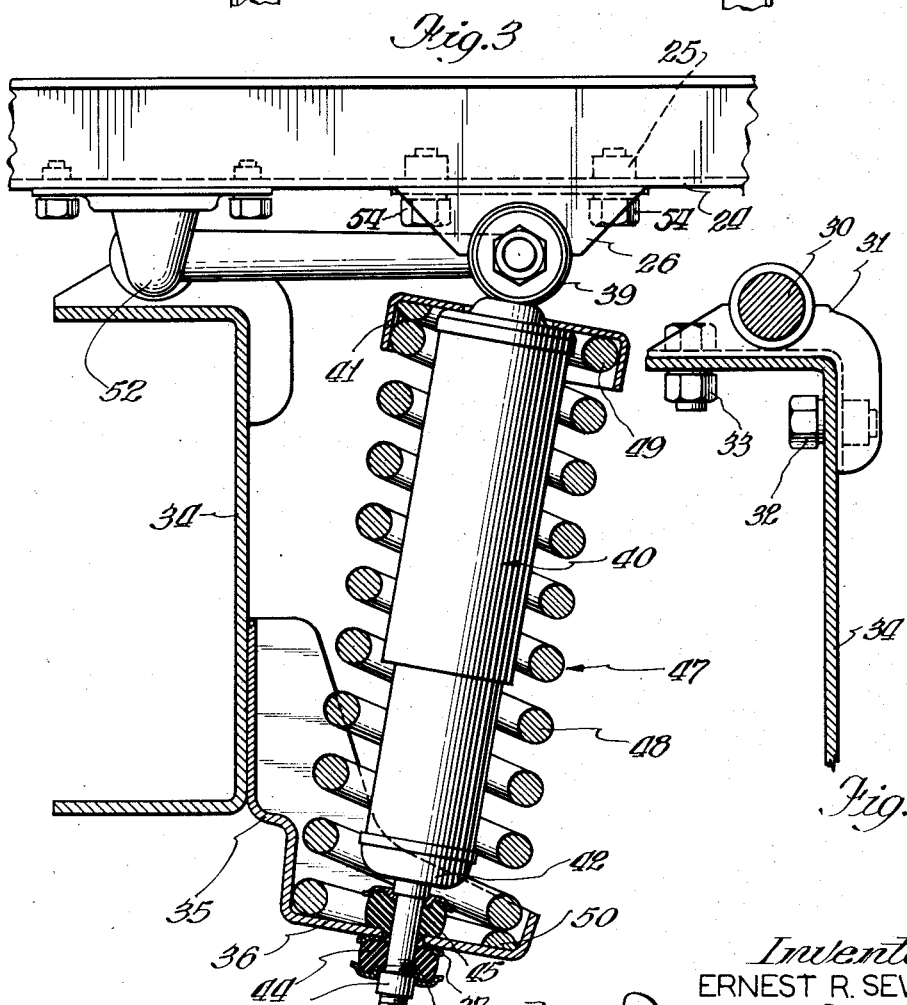
Inventor:
ERNEST R. SEWELIN
Attorney.

Patented May 19, 1953

2,639,186

UNITED STATES PATENT OFFICE 2,639,186

CAB MOUNTING

Ernest R. Sewelin, Waterloo, Ind., assignor to International Harvester Company, a corporation of New Jersey Application December 22, 1950, Serial No. 202,357

8 Claims. (Cl. 296—35)

1

This invention relates to a body mounting structure for automotive vehicles and more particularly to a new and improved vehicle cab mounting structure for trucks or the like utilizing coil springs for permitting limited flexibility between the vehicle chassis frame and the cab.

In the operation of trucks or other vehicles designed for carrying heavy loads over an uneven terrain or road surface irregularities, one or more ground engaging wheels are elevated differently from the other wheels causing the frame side sills to twist or weave. Hence, it is customary in present day truck design and construction to provide a chassis frame which is relatively flexible and capable of relieving the torsional forces imposed on the chassis frame by the distortion of frame side sills. While the automotive engineers have effectively mitigated the damaging influence of these forces on the chassis frame by providing a flexible frame, the problem of mounting the vehicle cab on the flexible frame in such a manner so as to minimize the transfer of the destructive forces to the cab has not been entirely solved. It is, therefore, the primary objective of the present invention to provide a novel cab mounting structure which allows a limited relative movement between the cab and the chassis frame whereby the distorting forces and shocks to which the chassis frame is subjected are transmitted to a lesser degree to the cab than heretofore possible.

Another object is the provision of a novel mounting structure for vehicle cabs whereby the cab may rock laterally with respect to the chassis frame about an axis parallel to the longitudinal median line of the chassis frame.

Still another object is the provision of novel stabilizing devices including coil springs for yieldably resisting lateral rocking of the cab with respect to the chassis frame.

A further object is to pivotally mount the cab on the chassis frame along a longitudinal axis which is disposed in a vertical plane passing through the longitudinal median line of the chassis frame where distortion of the frame by deflection of the side sills is least pronounced.

A further object is the provision of a vehicle cab mounted on a chassis frame in such a manner that it is not distorted annd subsequently damaged when the chassis frame upon which it is mounted is subjected to periodic torsional forces.

The foregoing and other important objects and desirable features inherent in and encompassed by the invention together with many of the purposes and uses thereof will become readily apparent from a reading of the ensuing description in conjunction with the annexed drawings, in which:

2

Fig. 2 is a plan view of the chassis frame incorporating the invention; a portion of the vehicle cab is cut away to better illustrate the coil spring stabilizing devices;

Fig. 3 is an enlarged sectional view taken substantially along the line 3—3 of Fig. 2; and Fig. 4 is a detailed sectional view taken substantially along line 4—4 of Fig. 2.

Figure 1:
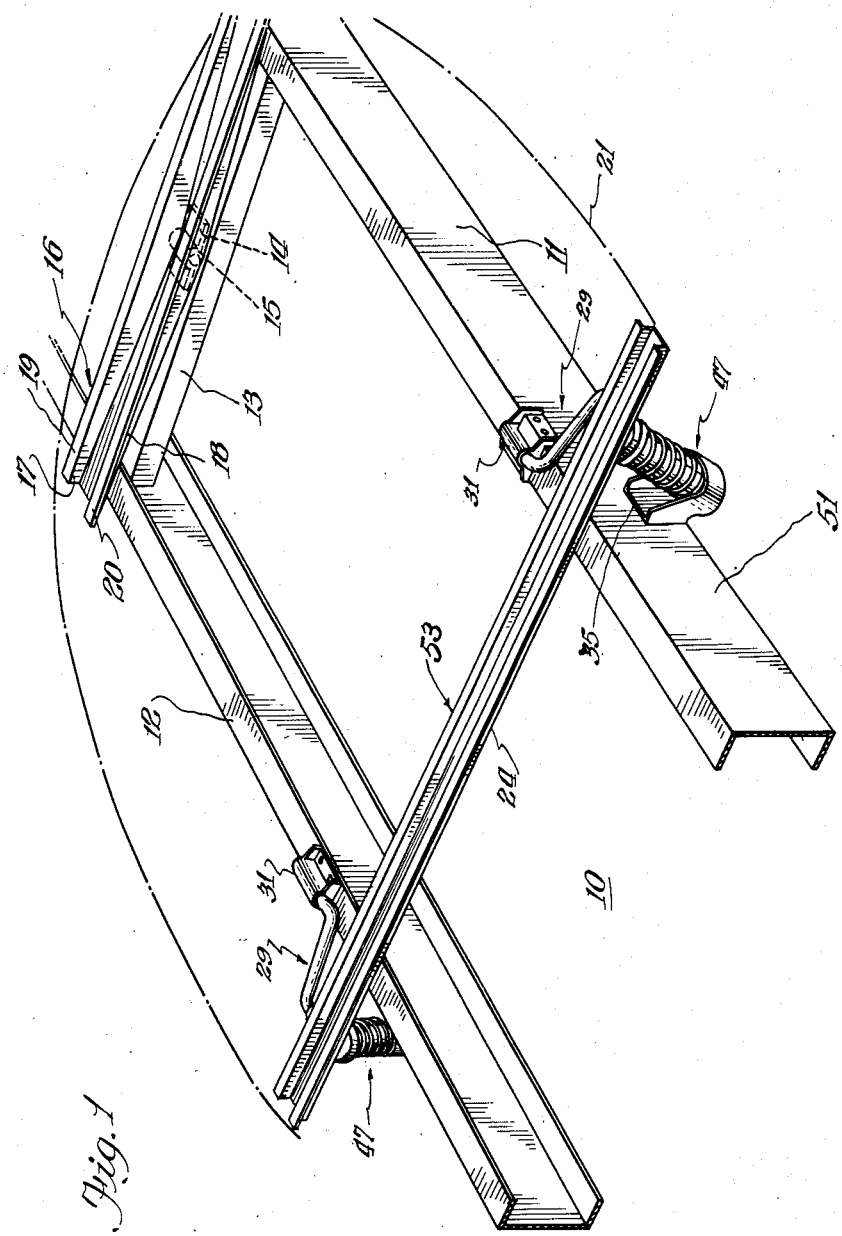
Fig. 1 is a perspective view of the front portion of the truck chassis frame taken from a point disposed angularly above the chassis frame.

Referring to the drawings in which like reference characters designate like elements throughout the various views, there is shown the front portion of a truck chassis frame 10. The chassis frame 10 includes a pair of longitudinally extending, transversely spaced side sill members 11 and 12 having the conventional U-shaped form interconnected by a plurality of longitudinally spaced transversely disposed cross members 13 (only one of which is shown in Fig. 1). The cross member 13 has a bracket member 14, as shown somewhat diagrammatically in Fig. 1, rigidly secured thereto midway between the side sill members 11, 12. The bracket member 14 has a longitudinally extending bearing portion 15 to which the central section of the inverted U-shaped rear cab cross member 16 is pivotally connected by any suitable means. The legs 17, 18 of the channel are provided with horizontal, oppositely projecting flanges 19, 20, respectively, for attachment to the floor panel 21, partially shown in Fig. 2. The outline of the sheet metal portion of the vehicle cab is shown in broken lines in Fig. 1. It will be obvious from the above described structure that the bracket member 14 and its associated parts provide a longitudinal pivot axis for the rear portion of the vehicle cab which is vertically spaced above the longitudinal median line of the chassis frame 10 and below the center of gravity of the cab.

Secured to the floor panel 21 forwardly of the rear cab cross member 16 is a front cab cross member 53. The front cab cross member 53 has an inverted channel shape and has its opposite ends 22, 23 extending transversely beyond the side sill members 11, 12, respectively. Fastened to the web 24 adjacent each end 22, 23 of the front cab cross member 53 by means of bolts 54 and nuts 25 is a depending bracket 26 provided with a longitudinally disposed bearing portion 27. One section or leg 28 of a substantially Z-shaped member or link 29 is journalled in the bearing portion 27. The opposite legs 30 of the links 29 are pivotally connected to bearing members 31 which are rigidly secured to side sill members 11, 12 by bolts 32 and nuts 33.

Rigidly connected to the web 34 of each side sill member 11, 12 is a depending, outwardly extending bracket member 35. Each bracket member 35 has a cup-shaped portion 36, as best shown in Fig. 3, provided with a centrally located recess 37.

Referring to Fig. 2, it will be noted that a short portion 38 of each leg 28 extends through its associated bearing portion 27. One end 39 of a conventional telescopic-type shock absorber 40 is pivotally connected to the short portion 38. An inverted cup-shaped abutment plate 41 is carried by each shock absorber 40 adjacent the end 39 thereof, the purpose of which will be explained hereinafter. The opposite end 42 of each shock absorber 40 is in the form of a threaded stem 43 of smaller diameter than the recess 37 and is adapted to extend through one of said recesses 37. Encircling the stem 43 on opposite sides of the cup-shaped portion 36 are a pair of annular rubber bushings 44, 45 which abut each other and the cup-shaped portion 36. A retaining nut 46 is engageable with the stem 43. It will be apparent that the stem 43 is capable of moving relatively with respect to the cup-shaped portion 36 by deformation of the bushings 44 and 45 which are made of rubber or other resilient material.

Inasmuch as the vehicle cab is mounted for oscillation on a generally horizontal and longitudinal axis, resilient means are provided for stabilizing the cab and for preventing excessive rocking of the same. The illustrated stabilizing members, designated generally by numeral 47, are in the form of coil springs symmetrically disposed on each side of the chassis frame 10. In view of the fact that both stabilizing members 47 are structurally and functionally the same, only the stabilizing member on one side of the chassis frame 10 will be described in detail. The stabilizing device positioned along side sill member 11 includes a coil spring 48 concentric with and positioned over the shock absorber 42. The upper end 49 of the coil spring 48 abuts the under side of the abutment plate 41 and the opposite or lower end 50 abuts the upper surface of the cup-shaped portion 36. It will be obvious that upon rocking of the frame 10 upwardly with respect to the vehicle cab the coil spring 48 is compressed between the abutment plate 41 and the cup-shaped portion 36 to resiliently resist such rocking.

In normal operation of the truck over a comparatively smooth road bed, the chassis frame twist is practically non-existent. The entire weight of the cab is supported by the rearwardly disposed bearing portion 15 and the oppositely disposed stabilizing members 47. The cab is maintained in a relatively fixed upright position with respect to the chassis frame 10 by the stabilizing members 47. Twisting of the chassis frame 10 wherein one end of one of the side sill members is raised with respect to the other side sill member is effectively accommodated without imposing severe damaging strains on the sheet metal parts of the vehicle cab structure. As an example, if the forward end indicated by numeral 51 of the side sill member 11 is suddenly displaced vertically upwardly with respect to the side sill member 12, the resulting forces are not transmitted to the vehicle cab structure to torsionally distort the same. Inasmuch as bracket 14 lies within a vertical plane containing the longitudinal median line of the chassis frame, substantial relative rocking movement between the vehicle cab and the chassis frame is permitted without materially distorting the vehicle cab. Movement of the forward end 51 of the side sill member 11 upwardly toward the vehicle cab is resisted by the spring member 48 positioned adjacent sill member 11 which is compressed during the above movement. It will be obvious that a minimum amount of road shock is transmitted to the cab structure by mounting the vehicle cab as described above. The damaging forces are effectively dissipated primarily by the coil springs 48 and secondarily by the shock absorbers 40.

It will be noted that the Z-shaped links 29 perform two functions; that is, they form the connecting structure for interconnecting one end of the coil springs 48 to the under side of the vehicle cab and they also serve as means for preventing movement of the vehicle cab with respect to the frame about a vertical axis through the bracket member 14. In other words, the links prevent a lateral shifting of the vehicle cab with respect to the chassis frame 10. Once the vehicle has passed over the road bed irregularity, the vehicle cab assumes its normal upright steadied position. In the event that the vehicle cab is rocked to an extreme position with reference to the chassis frame, a pair of transversely spaced, downwardly depending rubber blocks 52 secured to the underside of the vehicle cab cross member 21 are adapted to abut the side sill member 11, 12 and provide elastic stop limit means.

The embodiment of the invention chosen for the purposes of illustration and description herein is that preferred for achieving the objects of the invention and developing the utility thereof in a most desirable manner. It will be appreciated, therefore, that the particular structural and functional aspects emphasized herein are not intended to exclude but rather to suggest such other adaptations and modifications of the invention as fall within the spirit and scope of the invention as defined in the appended claims.

What is claimed is:

1. In a motor vehicle having a longitudinal frame and a body, the combination including said frame and body comprising means for connecting said body to said frame for controlled relative movement therebetween comprising pivot means securing one end of said body to said frame whereby said body is capable of rocking laterally with respect to said frame about a longitudinal axis vertically spaced above said frame; and means for yieldably resisting rocking of the body with respect to the frame including a pair of coil springs, said coil springs each having one end supported by said frame and having their opposite ends terminating adjacent the respective opposite sides of said body; and link means interconnecting the respective opposite sides of said body with said frame, the free end of each of said coil springs being connected to a portion of said link means.

2. The combination as set forth in claim 1, in which said link means includes a pair of links, each of said links being pivotally connected to said body, said frame, and the end of one of said coil springs.

3. The combination as set forth in claim 1, in which said link means includes a pair of links, each link having one end pivotally connected to the free end of one of said coil springs, its opposite end pivotally connected to a respective side of said frame, and an intermediate portion pivotally connected to a respective side of said body.

4. In a motor vehicle having a frame comprising a pair of longitudinally extending, transversely spaced sill members interconnected by a cross member; a vehicle body; means for supporting said body on said frame comprising pivot means connecting the rear end of said body to said cross member, said means being spaced substantially midway between said sill members whereby said body is capable of rocking laterally with respect to said frame means for yieldably resisting rocking of the body with respect to the frame including a pair of coil springs, said coil springs being longitudinally spaced forwardly of said pivot means and having one end abutting said frame, said coil springs extending upwardly and outwardly and having their opposite ends terminating adjacent respective opposite sides of said body; and link means including a pair of links, each link having one end pivotally connected to the free end of one of said coil springs, its opposite end pivotally connected to a respective side of said frame, and an intermediate portion pivotally connected to a respective side of said body.

5. A cab mounting for an automotive vehicle having a longitudinal frame including laterally spaced side frame members, a cab mounted above the frame, and a frame cross member connecting said side frame members comprising, a rear mounting connection between the rear of said cab and said frame cross member for pivotal movement on a longitudinal axis intermediate the side frame members; a bracket member secured to each side frame member, said bracket members being longitudinally spaced from said rear mounting connection and having cup-shaped portions extending outwardly of the frame; a bearing member secured to the top surface of each side frame member; a transversely disposed cab cross member having its ends overhanging said side frame members; a pair of Z-shaped members, each of said members having one leg rotatably connected to one of said bearing members and its opposite leg pivotally connected to a respective end of said cab cross member; a pair of telescopic type shock absorbers, each of said shock absorbers having one end pivotally attached to one of said cup-shaped portions and its opposite end pivotally connected to one of said members, said shock absorbers carrying an inverted cup-shaped abutment plate adjacent the connection of the shock absorbers to said members; coil springs surrounding said shock absorbers, each of said coil springs having one end abutting one of said cup-shaped portions and its opposite end abutting one of said abutment plates.

6. A cab mounting for an automotive vehicle having a longitudinal frame including laterally spaced side frame members, a cab vertically spaced above said frame, and a frame cross member connecting said side frame members comprising, a rear mounting connection between the rear of said cab and said frame cross member for pivotal movement on a longitudinal axis spaced midway between said side frame members; a bracket member secured to each side frame member, said bracket member being longitudinally spaced from said rear mounting connection and having cup-shaped portions extending outwardly of the frame; a transversely disposed cab cross member having its ends overhanging said side frame members; a pair of oppositely disposed Z-shaped members having one of their ends rotatably connected to said frame and their opposite ends pivotally connected to respective opposite ends of said cab cross member; shock absorber members disposed on each side of the frame interconnecting said members and said cup-shaped portions, said shock absorber members having abutment plates fixed thereto; a coil spring encircling each of said shock absorber members having one end abutting one of said abutment plates and its opposite end positioned within one of said cup-shaped portions.

7. In a motor vehicle having a longitudinal frame and a body, the combination including said frame and body comprising means for connecting said body to said frame for controlled relative movement therebetween comprising means pivotally supporting one end of the body on said frame, said means being disposed in a vertical plane passing through the longitudinal median line of said frame whereby said body is capable of rocking laterally with respect to said frame; and a pair of oppositely disposed resilient stabilizing devices arranged on the respective sides of said frame including coil spring means for preventing excessive rocking of the body with respect to the frame, said resilient stabilizing devices further including link means interconnecting the body and the frame to prevent movement of the body with respect to the frame about a vertical axis through the means pivotally supporting one end of the body on said frame, each of said coil spring means having one end connected to said frame and its opposite end connected to said link means.

8. In a motor vehicle having a longitudinal frame and a body, the combination including said frame and body comprising means for connecting said body to said frame for relative movement therebetween comprising means pivotally securing one end of said body to said frame whereby said body is capable of rocking laterally with respect to said frame about a longitudinal axis vertically spaced above said frame; and means for yieldably resisting rocking of the body with respect to the frame including a pair of coil springs, said springs having one end supported by said frame, said means further including link means interconnecting the body and the frame to prevent movement of the body with respect to the frame about a vertical axis through the said means pivotally securing one end of said body to said frame, said link means including a pair of transversely spaced links, each of said links being pivotally connected to a respective coil spring.

ERNEST R. SEWELIN.

References Cited in the file of this patent

UNITED STATES PATENTS

| Number | Name | Date |
|---|---|---|
| 1,737,160 | Johnston | Nov. 26, 1929 |
| 1,739,917 | Rayzor | Dec. 17, 1929 |
| 2,138,114 | Nelson | Nov. 29, 1938 |
| 2,485,794 | Waterbury et al. | Oct. 25, 1949 |
| 2,564,888 | Foley et al. | Aug. 21, 1951 |

FOREIGN PATENTS

| Number | Country | Date |
|---|---|---|
| 614,067 | France | Sept. 11, 1926 |
| 616,466 | Great Britain | Jan. 21, 1949 |